Dec. 5, 1939.                H. EISENLOHR                2,182,289
                    HYDRAULICALLY OPERATED HACKSAW
                           Filed June 15, 1938
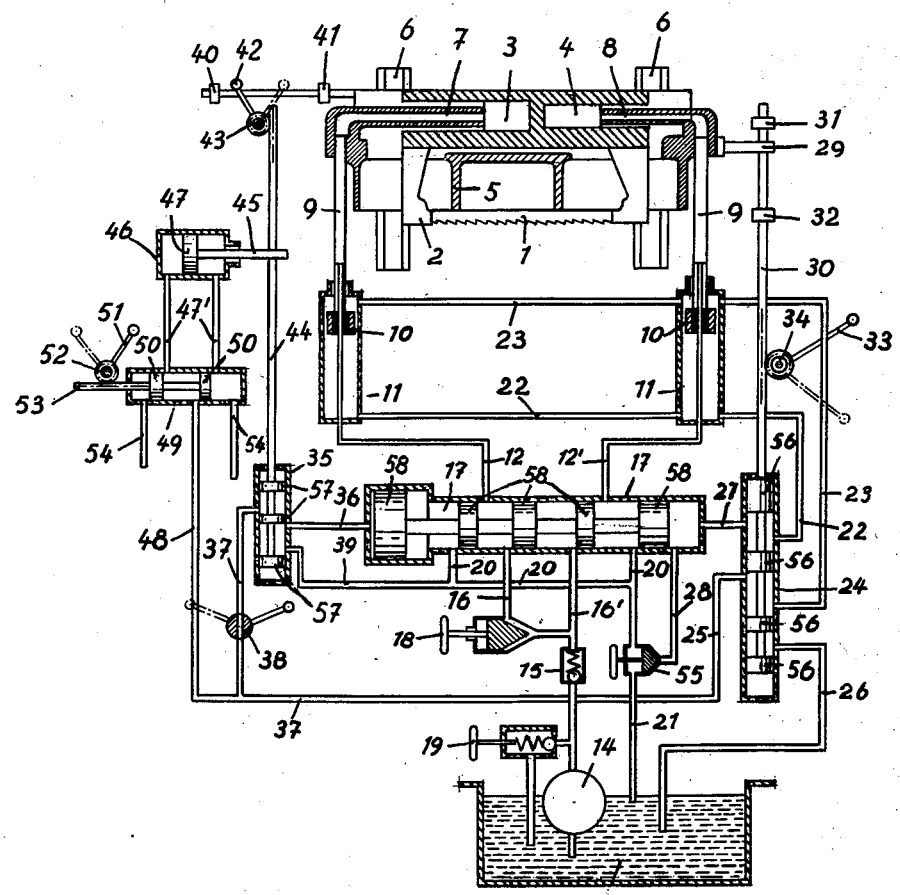
INVENTOR
HANS EISENLOHR
BY Young, Emery & Thompson
                        ATTYS.

Patented Dec. 5, 1939

2,182,289

UNITED STATES PATENT OFFICE 2,182,289

HYDRAULICALLY OPERATED HACKSAW

Hans Eisenlohr, Nurtingen, Wurttemberg, Germany

Application June 15, 1938, Serial No. 213,941
In Germany January 22, 1935

3 Claims. (Cl. 29—73)

The present invention relates to a hacksaw, that is fully hydraulically operated, and wherein the feed movement of the saw blade which is clamped in a blade frame, is in a direction parallel to itself. The feed movement or advancing movement of the saw is caused by the exertion of pressure on the saw blade. A saw of this type is specially suitable for high outputs.

Mechanical hacksaws are known, wherein the saw blade tensioning frame moves to and fro in a frame, that is guided during the cutting stroke, and is lifted off the work during the return stroke.

Hydraulic hacksaws are also already known, wherein the saw frame is guided cantilever fashion, and wherein only one piston rod is provided, which is connected to one end of the hacksaw frame. This arrangement however fails to provide suitable guidance for the reciprocating motion, and a suitable seating for the saw frame, which is indispensable for high outputs.

In contradistinction thereto, the saw according to the present invention is provided with a two sided seating. The hacksaw frame is not only guided at the top, but is also adapted to be guided close to the two extremities of the saw blade, so that the blade frame can neither twist nor tilt over. This feature is attained by the fact, that the back of the saw blade frame is constructed so as to form a double acting hydraulic cylinder, and by the fact, that the two pistons, which remain stationary in the direction of the cut, serve as a guiding slide for the said hacksaw frame. The said pistons are carried by the piston rods of two feed motion pistons, one arranged at each side of the saw bench frame, and sliding in vertical cylinders. The said two piston rods and pistons controlling the feed or advancing movement of the saw blade against the work piece.

Whereas in the hitherto known hacksaw, flexible tubing was used for supplying the pressure medium to the cylinder, which moved together during the feed or advancing movement with the saw, the pressure medium supply tubing to the pistons, is, according to the invention, connected with the feed piston and is adapted to slide telescopically over the supply pipes.

The reversal of the feed is effected by means of a piston valve, which is actuated by means of a trip or stop mounted on the saw blade. The reversal of the direction of the stroke is effected by means of a further piston valve, which is also operated by means of trip-stops mounted on the saw blade and adapted to act on a main piston valve. Means are further provided enabling also the work piece to be securely clamped in position by means of a separate piston, also actuated by the pressure medium, the said separate piston being controlled by a manually operated piston valve. The whole pressure system is subdivided by the interpolation of a suitable valve, in such manner, that the actuation of the master control valve of the clamping piston and of the feed piston is effected at a higher pressure than the pressure controlling the stroke of the saw. Cutting speed and feed speed can be regulated by means of separate valves, provided for this purpose in the respective circuits of the pressure medium. A by-pass or relief valve, which can be adjusted for the maximum pressure, is provided behind the pump generating the hydraulic pressure. Further a slide valve is provided in the pressure pipe leading to the main valve, for stopping the movement of the saw blade, and also a special lever arrangement for starting the feed motion of the saw.

The object of the present invention is illustrated by way of example in the appended drawing which is a diagrammatic view of the apparatus and system.

I denotes a saw blade which is rigidly clamped in a blade frame or strap 2.

The frame back or strap 2 is provided with two cylinders 3 and 4 one of which, the one 3 with the larger cross section bore, causes the working stroke, whilst the other, 4, with the smaller bore causes the return stroke of the blade. The cylinders 3 and 4 have an abutment 3' between them. The saw blade frame 2 slides in a supporting and guiding member 5, which is adapted to move in guide members 6. The cylinders 3 and 4 work conjointly with pistons 7 and 8, which are stationary in relation to the stroke, but are adapted to be displaced in the direction of the feed.

In order to effect the advance movement and the corresponding backward movement, the two pistons 7 and 8 are bored through from end to end, and are rigidly connected with bored through piston rods 9, which have bored pistons 10 mounted at their other extremity, the said pistons 10 being adapted to move in the direction of their longitudinal axes, in the direction of the feed within cylinders 11.

Liquid under pressure is fed into the cylinders 3 and 4 through pipes 12 and 12', which pass through the cylinders 11, and the pistons 10 and extend into the piston rods 9 in such manner as to form telescoping tubing therewith.

The liquid abstracted from a container 13 by means of a pump 14 is fed under pressure through a suitable pressure valve 15, and via the pipes 16 and 16' and a master control valve 17, 58 to the pipes 12 and 12'. It is possible to regulate the feed speed by means of a valve 18, and the maximum pressure for the whole system by means of a valve 19. The return of the liquid forced out of the cylinders 3 and 4, passes the same way up to the master control valve 17, and flows from there on through the pipes 20, 21 back into the liquid container.

The forward and backward movement of the feed pistons 10 is effected by means of liquid under pressure, which enters into the cylinders 11 through pipes 22 and 23, which connect them, and lead to a control valve 24, 56. Liquid under a greater pressure is fed to the control cylinder 24 through the pipe 25, the said liquid under pressure then entering, according to the position of the piston 56 either the pipe 22 or the pipe 23. The liquid under pressure forced out of the cylinder 11 by the feed piston 10, in so far as it issues from the pipe 23, can according to the position of the piston 56 flow back through a pipe 26 into the container 13, and can flow back, in so far as it issues from the pipe 22, through pipes 27, 28 and 21 into the container, the valve 55 for the regulation of the feed speed being interpolated in the pipe 28.

The piston 56 is actuated by means of an engagement member 29, mounted on the saw frame strap 2, the said member 29 being co-operable with adjustable stops 31 and 32 provided on a piston rod 30 of the piston 56. A hand lever 33 is further also provided, by means of which and of a pinion 34 the piston rod 30, which at this point is provided with teeth, can be displaced. The master control valve 17 is controlled by means of a piston valve 35, 57, with which it communicates through a pipe 36. A cylinder 35 is supplied with liquid under a higher pressure through a pipe 37 and a feed speed regulating valve 38. It is possible for the aforesaid higher pressure liquid to act, when the piston 57 is in a suitable position, through the pipe 36, on the master control piston 58. The discharge of the pressure liquid displaced by the piston 58 of the master control valve 17, 58 via the pipe 36 is effected through pipes 39, 20, 21. A piston 57 is adapted to be operated by means of stops 40, 41, mounted on the saw blade frame, which stops co-operate with a member 42, which acts through a pinion 43 on a toothed piston rod 44 carried by the piston 57.

Clamping of the work piece is effected by means of a ram 45, carried by a piston 47, which is movable in a cylinder 46. The piston 47 is controlled by liquid under pressure flowing into a cylinder 46 through pipes 47', which pressure liquid flows through the pipe 37 and is fed through a pipe 48 to a cylinder 49, and is distributed there by means of pistons 50 into one or other pipe of two pipes 47'. The pistons 50 can be adjusted by means of a lever 51, which acts by means of a pinion 52 on a toothed piston rod 53.

The discharge of the pressure liquid from the cylinder 49 takes place through pipes 54, which lead into the liquid container 13.

The device functions as follows, viz:

In the position shown in the drawing, the pressure liquid flows from the pump 14 through valve 15, valve 18, the pipe 16, the master control cylinder 17, the pipe 12 and the piston rod 9 and through the piston 7 into the cylinder 3 thereby moving the saw blade frame to the right. Simultaneously therewith pressure liquid flows out of the cylinder 4 through the piston 8, the piston rod 9, the pipe 12', the master control cylinder 17 and the pipe 20, valve 55, pipe 21 back into the container 13.

At the end of the movement to the right, the stop 40 strikes the lever arm 42, thereby displacing the control piston 57 downwards. This enables pressure liquid to enter through the pipes 37, 36 into the master control cylinder 17, thus moving the piston 58 to the right.

After the termination of this movement, the passage through 16, 12, is cut off, and the pressure liquid flows via the path 16', 17, 12', 9 and 8 into the cylinder 4, thereby causing the return stroke of the saw blade frame. The pressure liquid simultaneously forced out of the cylinder 3 flows off via 7, 9, 12, 17, 20 and 21 into the container 13.

The bores of the cylinders are in the manner known per se so dimensioned that the return stroke is effected at an accelerated speed. When the saw blade frame moves to the left, the stop 41 acts on the lever arm 42, whereby the control valve is again moved upwards. The master control piston 58 is again moved to the left by means of the pressure liquid which is forced out of the cylinders 11, during the feed movement, and flows through the pipe 22, the cylinder 24 and the pipe 27. The positive feed is effected by the fact, that, in the position shown in the drawing, the pressure liquid reaches through the pipe 25, the control cylinder 24 and the pipe 23, the upper part of the feed cylinders 11, thereby forcing the pistons 10 down. The displaced pressure liquid flows off through the path 22, 24, 27, 28, 21; it is possible to regulate the feed speed by means of the valve 55.

Raising of the saw blade frame during the return stroke is effected by the fact, that when the master control piston 58 moves to the right, pressure liquid is forced out through the pipe 27, and enters via 24, 22 into the cylinders 11, and acts in a raising manner by means of the feed piston 10.

The pipe 28 is closed when the master control piston 58 moves to the right, and the upper part of the cylinders 11 is emptied via pipes 23, 24, 25.

The depth of the saw cut is limited by the stops 31, 32. As soon as the arm 29 touches the stop 32, it displaces the piston rod 30 of the piston 56 downwards, thus enabling the liquid above the piston 10 to flow off via 23, 24, 26. In this position of the piston 56, the pressure liquid reaches the lower part of the cylinders 11 by the pipes 25, 24, 22, thereby causing the saw blade to be lifted off the work. The piston 56 is retained in its middle position by the upper abutment or trip 31. The recommencement of the feed is effected by the lever 33.

The thus designed hydraulic cold saw is in fact a unit, which is proving itself as especially elastic by reason of its complete use of hydraulic actuation, and shows the above mentioned advantages in comparison with the known devices.

What I claim is:

1. A hydraulically operated hacksaw system comprising a hacksaw frame, means to support and guide each end thereof and to prevent twisting of the said frame, means disposed in the back of the said frame to form a double acting cylinder, a stationary piston in each cylinder, each piston being hollow for the flow of the hydraulic medium, a container for the said hydraulic medium, communication means for the pistons and the container for the hydraulic medium, and means to control the delivery of the hydraulic medium from the said container into the respective cylinder to effect reciprocation of the hacksaw.

2. A hydraulically operated hacksaw system comprising a hacksaw frame, a tubular support for the frame, a cylinder in each end of the tubular support, an abutment between the two cylinders, a stationary piston extending into each cylinder, each piston being hollow for the flow of the hydraulic medium, supporting and guiding means disposed at each end of the hacksaw frame, a container for the hydraulic medium, pipe connections between the container and each hollow stationary piston, a multiple master distributing piston valve in the pipe connections, a pump having tubular connection with the said multiple master piston valve, and means to control the delivery of the hydraulic medium from the container through the hollow stationary pistons to the respective cylinders associated with the hacksaw frame and to control the return of the hydraulic medium to the container.

3. A hydraulically operated hacksaw system comprising a frame supporting the hacksaw blade and having a tubular member forming the back of the frame, an abutment dividing the said tubular member into two cylinders of different internal diameters, a stationary piston extending into each cylinder, each piston being hollow for the flow of the hydraulic medium, a master multipiston valve in pipe communication with the stationary pistons, a supply tank, and means to control the delivery of the hydraulic medium to the interior of the tubular member forming the back of the hacksaw frame to effect reciprocation of the said frame and piston valve and to control the return of the hydraulic medium to the supply tank.

HANS EISENLOHR.